Feb. 8, 1938.   K. N. OGLE   2,107,305
ADJUSTABLE LENS SYSTEM
Filed March 2, 1934   3 Sheets-Sheet 1
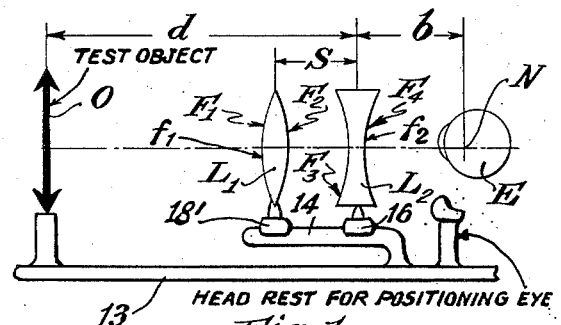
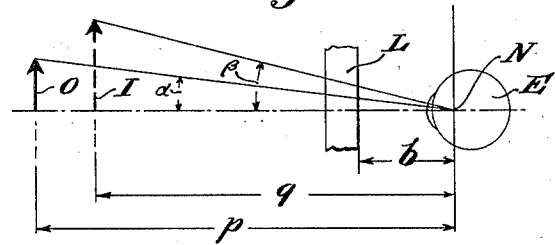
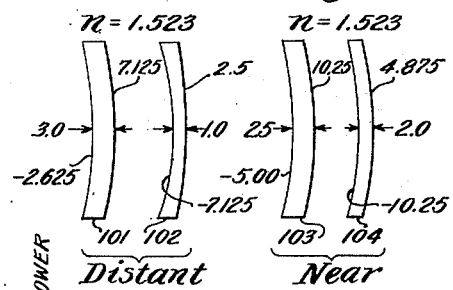
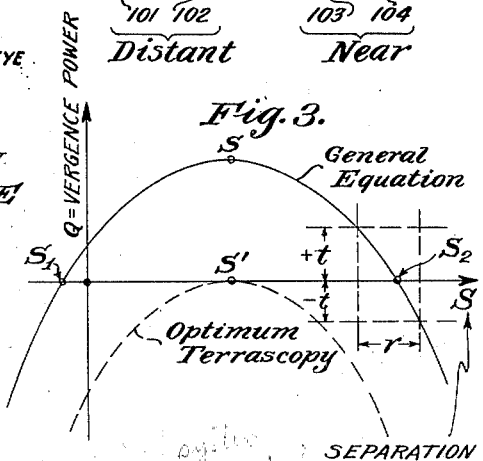
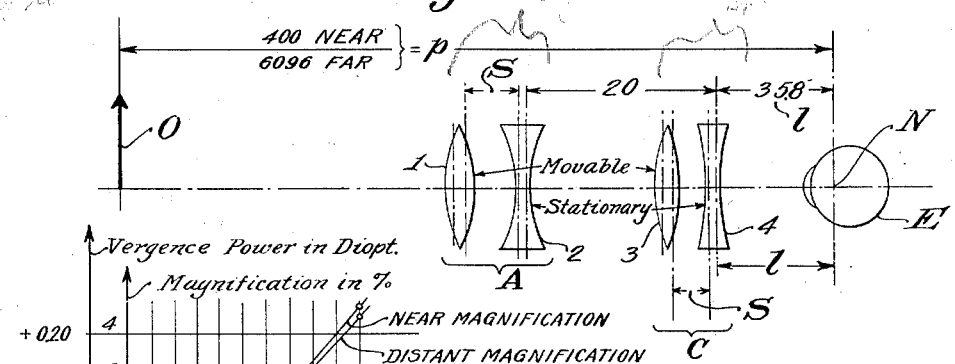
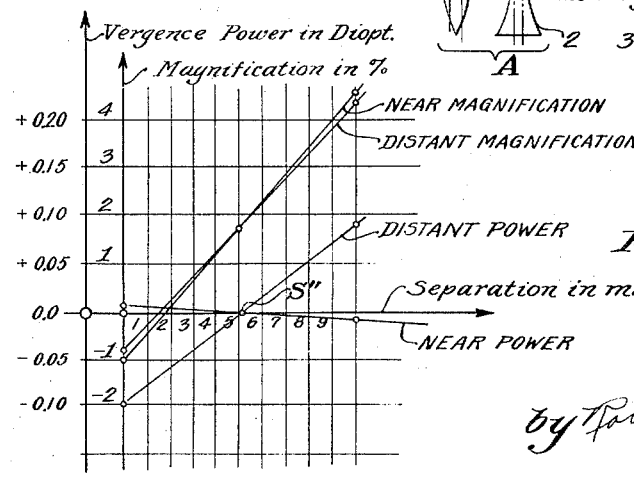
Inventor,
Kenneth N. Ogle,
by Roberts, Cushman and Woodbury
Attys.

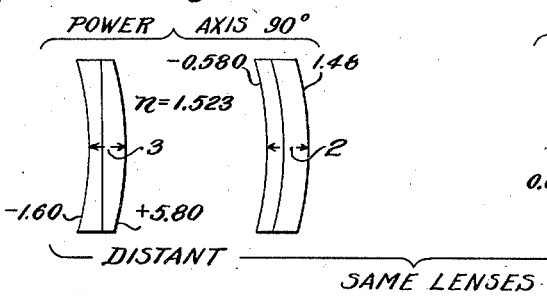
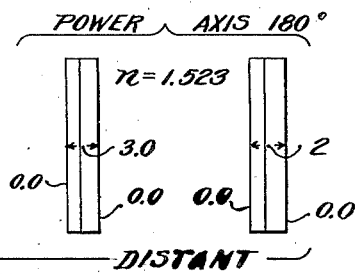
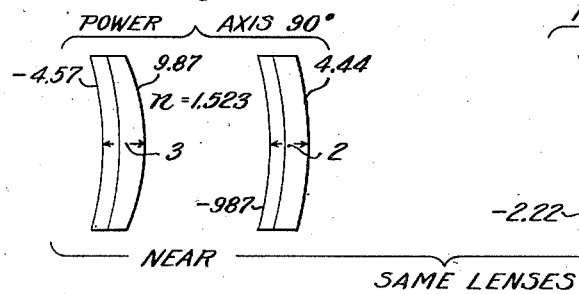
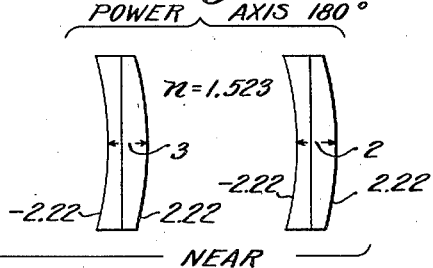
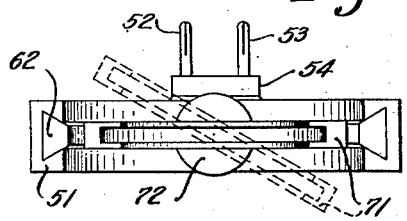
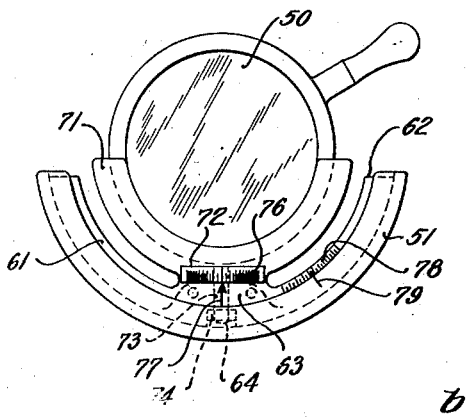
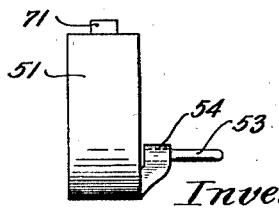

Feb. 8, 1938.　　　　K. N. OGLE　　　　2,107,305
ADJUSTABLE LENS SYSTEM
Filed March 2, 1934　　　　3 Sheets-Sheet 3
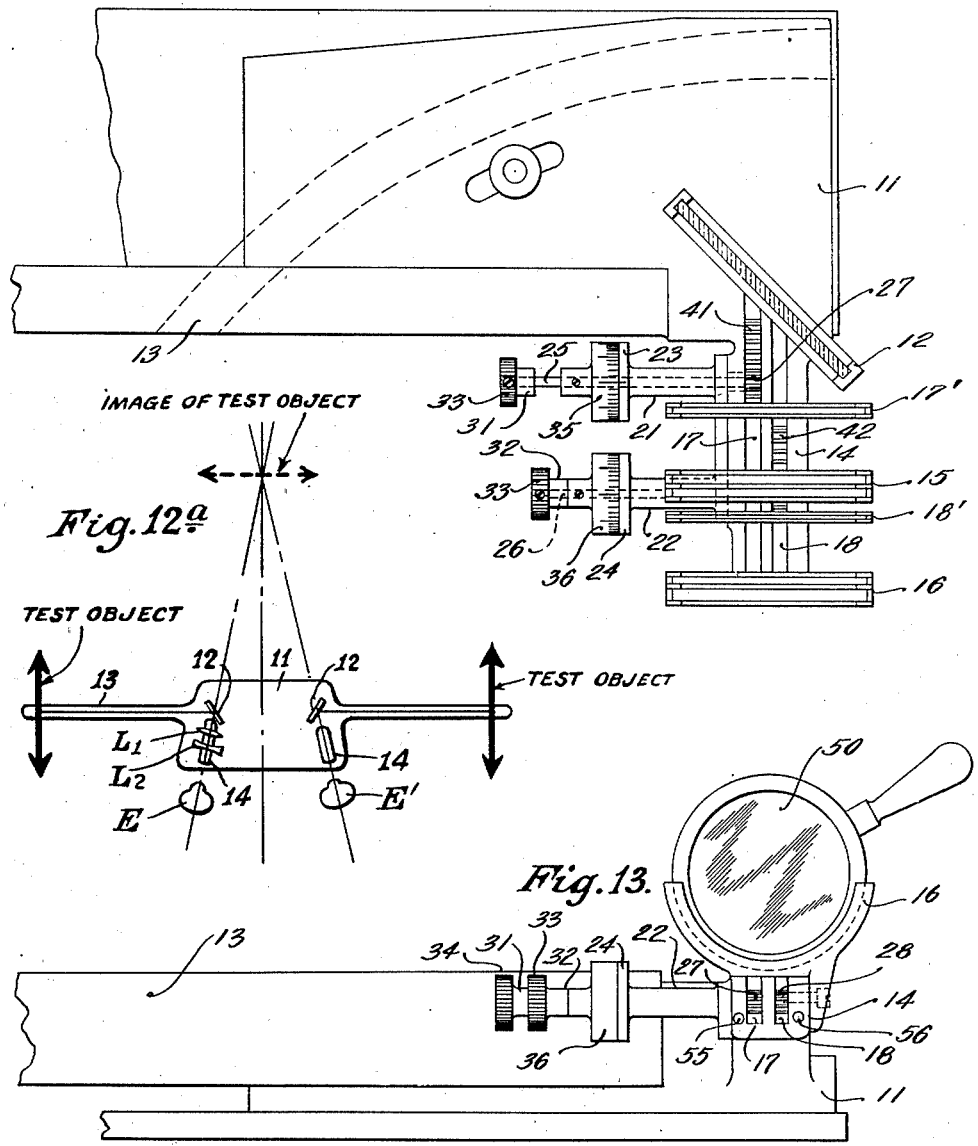
Inventor,
Kenneth N. Ogle,
by Roberts, Cushman & Woodberry
Attys.

Patented Feb. 8, 1938

2,107,305

UNITED STATES PATENT OFFICE 2,107,305

ADJUSTABLE LENS SYSTEM

Kenneth N. Ogle, Hanover, N. H., assignor to Trustees of Dartmouth College, Hanover, N. H., a corporation of New Hampshire Application March 2, 1934, Serial No. 713,701

10 Claims. (Cl. 88—20)

The present invention deals with the problem of adjustably changing the size and/or shape of an optical image without substantially affecting other characteristics of the optical system in question, as especially the distance between object and image. This problem may arise in various branches of the optical art, but it is of particular importance in connection with the testing and compensating of certain abnormal conditions of the human visual mechanism involving the relative size and shape of the ocular images of the two eyes. This subject matter is discussed and explained at length in the Patent No. 1,944,871 to Adelbert Ames, Jr. and Gordon H. Gliddon, entitled "Clinical optical mensuration method and instruments", of January 30, 1934, and the Patent No. 1,933,578 to the same inventors, entitled "Eyeglasses for correcting retinal image asymmetry", of November 7, 1933, and in a number of publications in scientific periodicals, as for example in "The Journal of the Optical Society of America", vol. 22, pages 538 et seq.

As explained in the above-identified patent for "Clinical optical mensuration method and instruments", tests of patients who are examined with the aid of this instrument, or of instruments serving similar purposes, comprise the measurement and compensation of the above-mentioned size discrepancies of the ocular images with the aid of lenses compensating this defect. Heretofore, the magnitudes of these differences in size of the ocular images of patients were clinically determined with the aid of sets of lenses, by finding those lenses which, if placed before one eye or both eyes, equalize the ocular images of the eyes. Such a set of lenses consists of a series of lenses of the general type described in the above-identified Patent No. 1,933,578, made in fixed steps of magnification, over-all or meridional.

For continued practical use, such lens sets involve certain disadvantages, among which is the comparatively high cost of a set of a necessarily great number of lenses and the inconvenience of fixed steps, which not only often necessitates a frequent change of test lenses primarily based on guesswork, with the consequent interruptions and the prolongation of the test operations, but may also impair to some extent the exactitude of the examination. Experience has shown that it is very desirable to have a device with which it is possible to attain a continuous change in the image size of an eye, and preferably of each eye over a wide range of magnification for a given finite distance, over the entire field of vision as well as on any meridian. It is also desirable that such a device should be adapted for control not only by the operator, but also by the patient.

Although such a device is of great importance for the above discussed purpose, it is evident that it is equally useful for different purposes involving similar optical problems, as for example, for exercising eyes, and it is therefore one of the principal objects of the present invention to provide an optical device which permits the continuous adjustment of the magnitude or size and/or shape of an optical image, without substantial change of its position in space, that is, a lens system that permits gradual changes of image magnitude while its optical power is not substantially affected by such changes.

Other objects are to provide such a device which can be conveniently operated, is comparatively inexpensive, and permits rapid continuous adjustment of image size, and the exact determination of that adjustment in a simple and convenient manner. In another aspect, the invention provides a novel composite lens system which changes the size of an optical image, without substantially affecting the distance of the image from a fixed point. A further feature of the invention is such a lens system that permits the variation of the change in magnitude without change of power, by varying the separation of certain elements of the system. Still another object is the continuous variation of the change of image magnitude within a comparatively wide range by continuously varying the lens separation of a composite optical system, and means for varying the separation in a convenient, exact, and efficient manner, which means also permits the easy and yet reliable determination of the prevailing change in magnification.

These and other aspects and objects of my invention will be apparent from the following explanation of its genus with reference to a practical application thereof to a device for testing eyes for ocular image discrepancies. The description refers to drawings in which:

Figs. 1 and 2 are diagrams showing relations for calculating a lens combination according to the invention;

Fig. 3 is a diagram indicating theoretical functional relationships between certain characteristics of the lens system according to the present invention;

Fig. 4 is a diagram similar to Fig. 1 showing the arrangement of an embodiment of the invention;

Figs. 5 to 11 are diagrams giving the typical optical data of a set of lens systems according to the invention;

Figs. 12 and 13 are plan and front elevations, respectively, of the mounting for an embodiment of the invention;

Fig. 12a is a diagram explaining the use of an instrument according to the invention for investigating ocular image discrepancies; and Figs. 14, 15 and 16 are plan, front elevation, and side elevation, respectively, of a modification of the mounting shown in Figs. 11 and 12.

The embodiment of the invention now to be described is suited for use in a device for testing eyes, as for example described in copending application Serial No. 706,523, filed January 13, 1934, which permits the simultaneous determination of dimensional image defects which may be uniformly over-all, or meridionally symmetrical, or unsymmetrical (all these defects being shortly referred to as size and/or shape defects), and which may be conveniently manipulated by the clinician or the patient who is being examined.

Generally speaking, a lens system according to the invention and conforming to the above-described requirements has lens components whose separation is variable and determinable, and which components are so dimensioned and arranged that, upon changing their separation, the virtual image of an object as seen therethrough does not substantially change its position relative to the observer, but does change its size according to the prevailing separation.

It should be observed in this connection that the Galilean telescope, which also involves lens elements with adjustable separation, is fundamentally distinct from the system according to the present invention. The Galilean telescope provides substantially constant magnification with changing power, its changes in separation having the purpose of varying the focal distance in order to adjust the instrument for different distances of the object which is observed, whereas the present system provides for changing magnification with substantially constant power, its separation changes having the purpose of varying the magnification for a given object distance.

The properties of the lens system will be conveniently referred to some point N, which depending upon circumstances might be taken as the mean nodal point or the entrance pupil of the eye or as a point in the lens system itself. In Fig. 1, as the example, N is taken as the mean nodal point of an average eye which looks at an object O through the lens system L. The object distance designated by $p$, the image distance designated by $q$, and the distance of the lens component farthest from the object designated by $b$ will all be measured from the point of reference N. The quantity $$Q = \frac{1}{p} - \frac{1}{q} \text{ (diopters)}$$

will be defined as the vergence power of the lens system relative to the point N, when $p$ and $q$ are measured in meters. The visual angles subtended at the point N by corresponding points of the object O and the image I are designated by $\alpha$ and $\beta$. The angular magnification of the system relative to the point N will then be expressed as the ratio $$M = \frac{\beta}{\alpha}$$

or in per cent magnification $$m\% = (M-1) \times 100$$

It will be understood that value M determines the size, extension or spatial quality of the image, or elementary images, of a given object, herein also referred to as "magnitude".

The characteristics of a lens system will first be considered, which, at a certain separation, does not affect the position of the image of the object relative to the eye, but does (or in certain instances may not) affect the size of the image relative to that of the object. The virtual image produced by such a lens system, which may be designated as "terrascopic", must be upright and at the same distance from N as the object, but its size or magnitude may vary from that of the object itself. A lens system which is terrascopic, i. e., which produces a virtual image of an object that is situated at the same position in space as the object is said to have zero vergence power, that is, $Q=0$, since $p=q$. The properties of terrascopic systems are in most respects analogous to those of telescopic ones, with the main difference that, in a terrascopic system, object and image are at a finite distance instead of at an infinite distance as in the case of telescopic systems.

For a given distance of the object field from the eye, assuming two thin lens elements, and referring to Fig. 2 where $L_1$ and $L_2$ are lenses with focal lengths $f_1$ and $f_2$, respectively, S is the separation of the lenses, $d$ the distance of the object O from the farthest lens element of the system, and $e$ the distance of that lens element from the point N, the following relation exists between the focal lengths of a terrascopic system:

$$S^2[d+f_2] - Sd[d+2f_2] + d^2[f_1+f_2] = 0 \quad (1)$$

where $p = d + b$.

This equation is of the second degree in S, the separation, and therefore if the values $f_1$, $f_2$ and $d$ are fixed, there are in general, two separations $S_1$ and $S_2$ for which the lens combination is exactly terrascopic as above defined. At any other separation, the system is not strictly terrascopic, that is, it will not fulfill the previously formulated requirement of unchanged relative position of virtual image and object, but changed magnification.

The possibility of obtaining a system of the desired properties arises from the fact that Equation (1) is a continuous function in S. It was found that the vergence power of the lens system under discussion, as a function of S, the separation, is represented in a general way by the parabolic type curve shown in Fig. 3, in which vergence powers Q are plotted over lens separations S, and where the two strictly terrascopic solutions $S_1$ and $S_2$ are indicated. The position of the curve relative to the system of reference and the solutions $S_1$ and $S_2$ are determined by the values of $f_1$ and $f_2$.

By means of a general equation, the relation between $f_1$, $d$ and S for the minimum change in the vergence power Q for changes in S was found to be:

$$f_1 = \frac{1}{2}(d-S) \quad (2)$$

Assuming that it is desired (as for example in the embodiment herein described in detail) to have a system which is substantially terrascopic over a certain range of separations, and exactly terrascopic for one separation S' within this range, this system will at separation S' conform to equation (1). Combining the Equations (1) and (2) we obtain the values of the focal lengths of the two components of an adjustable system which will have a minimum change of vergence power with change in separation for a given range, and will have exactly zero vergence power (e. g., be terrascopic) at the separation $S'$ within that range, namely:

$$f_1 = \frac{1}{2}(d-S') = \frac{i}{2}$$

$$f_2 = -\frac{ld}{2}\left[1 - \frac{S'}{d-S'}\right] = -\frac{d(i-S')}{2i} \quad (3)$$

where $$d = p-b \text{ and } i = d-S'$$

If $f_1$ and $f_2$ are chosen according to these formulae, the vergence power curve as a function of $S$ is tangent at the point $S'$, and gives the optimum condition for a substantially terrascopic system. This curve for optimum terrascopy is indicated in dotted lines in Fig. 3.

The magnification, as defined above, produced by such a system at any separation $S$ is given by $$M = \frac{p}{p - (\phi b + F_1 S)(p-b-S) - bF_2 S} \quad (4)$$

where $$\phi = F_1 + F_2 - F_1 F_2 S$$

and $$F_1 = \frac{1}{f_1}; \quad F_2 = \frac{1}{f_2}$$

For example, the characteristics of such a thin lens system to be used for an object distance $p = 400$ mm., with the posterior lens a distance $b = 30$ mm. from the mean nodal point of the eye, a separation range of the elements from zero to 10 mm., and a strictly terrascopic separation of $S' = 5$ mm. are as follows:

$f_1 = 182.500$ mm.     $F_1 = 5.4795$ diopters
$f_2 = -182.466$ mm.     $F_2 = -5.4805$ diopters

| At a separation of | Magnification | Vergence power |
|---|---|---|
| mm. | Percent | Diopters |
| 0 | 0.00 | −0.0008 |
| 5 | 2.78 | 0.0000 |
| 10 | 5.63 | −0.0009 |

This range of magnification is very satisfactory for the requirements of testing and compensating errors in the relative size and shape of the ocular images of the two eyes, and, as evidenced by the power values in the last column of the above table, the system is substantially terrascopic over the separations used. The change in magnification with change in $S$ is substantially linear, which fact is of great convenience in the design of the device. It will also be understood that the same procedure can be applied to an adjustable size lens system required to have a substantially constant vergence power, with changes in magnification as the separation of the elements is changed, whereas the relative positions of object and image remain unchanged. It should be noted that for a given visual distance $p$, if the separation is to be uniquely and substantially terrascopic within certain separations, the magnification change is automatically determined.

For large visual distances, as for example an infinite distance (as represented by approximately 6 m.), the range of magnification of a substantially true terrascopic system according to the above theory would be too small. For such distances, an approximately terrascopic system having certain optical powers within predetermined permissible limits, and being strictly terrascopic for one point within these limits can be used.

These limits may be defined by certain tolerances indicated at $+t$ and $-t$ of Fig. 3, within which changing separations effect only such power changes that can be tolerated as harmless for any particular purpose of the device. It will now be evident that either the entire curve shown in Fig. 3, with both terrascopic points, can be utilized, or only a portion covering the range $r$ including one strictly terrascopic point $S_2$, which latter possibility has been discussed above for optimum point $S'$ and is made use of in the practical embodiment described hereinafter, whose power-separation relation is shown in Fig. 7. In this figure, point $S''$ corresponds to point $S_2$ of Fig. 3, and the 10 mm. separation range of Fig. 7 corresponds to range $r$ of Fig. 3, the power tolerance in this case being $+0.10$ diopter. An example of the magnitude of such limits will be given below when describing a specific set of lenses for an eye testing instrument according to Patent No. 1,944,871, which permits measurements involving ocular image size changes of substantially equal magnitude at reading distances and when looking at greater distances.

This elementary theory treats only with thin lenses, as initially assumed. If the lens thicknesses are included, the distance $b$ will specify the distance of the second principal plane of the second or eye lens from the mean nodal point of the eye. The separation symbol $S$ (compare Fig. 4) will indicate the separation between the second principal plane of the first lens and the first principal plane of the second lens. The separation $S$ will then be less limited by the physical properties of the system. It may, for example, be made negative when the actual lenses are in contact, if the first and second lenses (or lens systems), are so designed that the second principal plane of the first lens and the first principal plane of the second lens can overlap, that is, pass through each other and separate negatively as the separation of the actual lenses is decreased. A negative separation would then give a diminution of the dioptric image.

The values of the curves of the lenses as actually used can be determined uniquely, provided the optical thicknesses of the lenses are specified beforehand.

This is easily done, for the optical thickness ($\epsilon$) of the lenses will be approximately:

$$\epsilon = \frac{1}{3}(t_1 + t_2)$$

where $t_1$ and $t_2$ are the thicknesses of the objective and ocular lenses respectively.

If it is known that the powers of the system will remain within desired limits, for a given range of magnifications, the constants of the individual lenses can be found directly. The conditions for the determination of the device when the magnifications are to be specified for a given object distance $p$ from the eye, and the near lens at a given distance $b$ from the eye (compare Fig. 4), are:

(1) At a separation $S_0$ of the interior principal planes (lenses in contact), the device is to have a magnification $M_0$; and (2) At a separation $S$ of the interior principal planes, where $S = S_0 + \sigma$, where $\sigma$ is the change in separation as compared with $S_0$, the device is to have a magnification of $M$, and zero vergence power (condition of terrascopy).

Thus, three conditions, namely for $M_0$, $M$, $\sigma$, are specified for finding the three optical constants of the system, viz: $\varphi_1$, $\varphi_2$ and $S$ (or $S_0$), where $\varphi_1$ and $\varphi_2$ are the true powers of the two elements, respectively. For paraxial rays the value of S can be found from:

$$S^3[(k-k_0)p] - S^2[(k-k_0)(p-l)\Theta p + 2\sigma(kp-(p-b)(-\Theta)-bkM\Theta)] -$$

$$S\sigma\left[\frac{A}{p-b}(2AMb)-(p-bM)(p-b-\epsilon+\sigma)+kb(p-b)-b\epsilon\right] + \frac{A^2Mb}{p-b}(p-b-\epsilon+\sigma) = 0$$

where $$k = \frac{M-1}{M}$$

$$k_0 = \frac{M_0-1}{M_0}$$

$$A = k(p-l) - \epsilon$$

$$\Theta = \frac{p-l-\epsilon}{p-l}$$

and $\epsilon$ is the total optical thickness of the lenses, which is usually about 1.3 to 2.0 mm.

Solving this equation for S, for example by Horner's method, one can then find $\varphi_1$, and $\varphi_2$ by $$\varphi_1 = \frac{\left[\frac{M-1}{M}\right][p-b-\epsilon]-\epsilon}{S[p-b-S+\epsilon]}$$

$$\varphi_2 = \frac{[M-1][p-b-S-\epsilon]-\epsilon}{S[p-b-S]}$$

If the lens surfaces are denoted by their focal powers $F_1$, $F_2$, $F_3$ and $F_4$ as indicated in Fig. 2, two of them must be known, that is, specified in order to solve for any of the actual surfaces. This is usually the desirable thing to do.

If $F_2$ and $F_3$ are specified (in the design given below as an example, $F_2 = -F_3$) the procedure is as follows:

(1) Find $C_2$ by:

$$C_2 = \frac{-S \pm \sqrt{S^2 - 4RT}}{2R}$$

where $R = Ab$, $S = Bh - Da + A(g-\epsilon)$
$T = B(g-\epsilon) - ag$ $$a = \frac{\varphi_1 n - F_2}{\varphi_1} \qquad h = \frac{\varphi_2 n - F_3}{\varphi_2}$$

$$d = \frac{\varphi_1 - F_2}{\varphi_1} \qquad f = \frac{\varphi_2 - F_3}{\varphi_2}$$

$$g = t_0 - S \qquad A = gF_2F_3 - fF_2 - dF_3$$

$$b = d - gF_2 \qquad D = f - gF_3$$

$n$ = index of refraction.

(2) Find $C_1$ by:

$$C_1 = -\frac{1}{a}[hC_2 + g - \epsilon]$$

(3) Find $F_1$ from:

$$F_1 = \frac{\varphi_1 - F_2}{1 - F_2 C_1}$$

(4) Find $F_4$ from:

$$F_4 = \frac{\varphi_2 - F_3}{1 - F_3 C_2}$$

(5) Find $t_1$ and $t_2$ from:

$$t_1 = C_1 n$$

$$t_2 = C_2 n$$

The characteristics of the system can be found by simple ray tracing through the system for several separations.

The lens curvatures so obtained would probably require tools not now in commercial use. In order to utilize tools already on hand, the approximate powers $\varphi_1$ and $\varphi_2$ (or $F_1$ and $F_4$) may be obtained from the elementary theory, and the final curves for the lenses found by simple paraxial ray tracing using trial and error.

Lenses of the type of the embodiment herein more specifically described, namely test lenses for use with instruments for determining ocular image disparities, were designed to conform to the following conditions, whereby it is understood that other uses of the new lens system will require other conditions:

(1) Due to the facts that two variable separation lens systems are employed, one for overall and one for meridional image size changes, and that other corrective elements must be placed in front of the eyes, the available space is limited. The separation of the inner surfaces of the elements of each lens system is therefore given, and in the present embodiment assumed to be approximately 10 mm.

(2) In accordance with the image size differences which actually occur in binocular vision, the image magnification should for convenience be continuously variable through differences of about 5%, as for example, approximately between $-1\%$ and $+4\%$ of any linear dimension as seen without the lens system.

(3) The vergence power for all separations, and for all visualization distances (that is in actual practice for 40 cm. and 6 m.) should be a minimum, preferably below the threshold difference of power sensitivity, that is, less than 0.12 diopter.

(4) It is in many cases desirable to grind the lens surfaces with tools used by the optical manufacturers for making conventional lenses, and the present example is designed with this condition in view, although it may in other cases be desirable to provide specially made tools. In that latter case, since no regard has to be given to tools, more leniency is given the designer.

(5) The distortion should be a minimum, so far as compatible with condition (2).

(6) The device should permit the reading of magnifications on the same scale for all visualization distance.

(7) Means for continuously changing the overall magnification as well as for changing the magnification in any single meridian must be provided, both complying with the preceding conditions.

It was found that in order to accomplish these objectives it is advantageous to use for each eye four variable separation lens pairs, two giving over-all magnification for near and distant vision, respectively, and two giving meridional magnification also for near and distant vision, respectively, in a set up schematically shown for one eye and one distance in Fig. 4. In this figure, A is the cylindrical system with lenses 1 and 2, and C the spherical system with lenses 3 and 4. The lens arrangement is quite similar for near and distant vision. The approximate lens distances from the eye, suitable for purposes of the instrument, are given in millimeters, in relation to the mean nodal point N of the eye E. It is of course understood that a similar arrangement is used with each eye, so that a complete variable size lens equipment for a clinical instrument of the type referred to comprises two lens sets (one set for the right and one for the left eye), each set having two lens groups (a spherical lens group and a cylindrical lens group), each group having two lens pairs (one lens pair for distant vision and one lens pair for near vision) and each pair comprising a negative and a positive lens element with continuously adjustable separation.

Figs. 5 and 6 show diagrammatically the optical data of the spherical lens pairs for near and distant vision, respectively, of a set of practical lenses for over-all magnification without substantial change in power. In Figs. 5, 6 and 8 to 11 the curvatures are given in diopters and the lens thickness in mm, the refractory index being $n=1.523$. In Fig. 5, 101 and 102 are the spherical lens elements of the system for distant vision, and in Fig. 6, 103 and 104 are the spherical elements for near vision. Fig. 7 indicates the relation between the separation S in mm, the magnification in per cent, and the vergence power in diopters, for the lens systems according to Figs. 5 and 6. It will be observed from Fig. 7, that the range of magnification is practically the same for near and distant vision, that there is practically no change in vergence power over the entire magnification range for near vision, that the magnifications vary linearly within the range of $-1$ to $+4\%$, and that the power at distant vision is within the range of $\pm 0.1$ diopter, which was found practically to be near the threshold of power sensitivity for the eye.

Figs. 8, 9, 10, and 11 indicate in a similar manner the data of practical lens pairs for image size changes in one meridian, and zero per cent magnification in the meridian at right angles. Figs. 8 and 9 relate to the system for distant vision and give the dimensions in two meridians, e. g., at 90° and 180°, respectively. Figs. 10 and 11 similarly supply the data of the lens pairs for near vision. The relation between lens element separation, power, and magnification are in the 90° meridian, which is the one effective for image magnification, quite similar to those depicted in Fig. 7.

Whereas the lens combinations for over-all size changes require only spherical surfaces, the meridional magnification systems were found to demand double toric lens elements, as shown in Figs. 8 to 11. Single piece double toric lenses would be preferable, but since such lenses can at the present time not be ground with ordinary means, the lenses are preferably split into two single toric elements, with identical inner surfaces, which are then cemented together with these surfaces in properly aligned position. Some difficulty was encountered in laying out a system for near vision with zero per cent magnification in one meridian in order to adhere to tools ordinarily available. The near lens combination shown in Figs. 10 and 11 is, however, quite satisfactory, having in the 180° meridian zero per cent magnification with a power of approximately 0.05 diopter, which is negligibly small.

In the actual design of these lenses the initial magnification, that is, the magnification of the device when the lenses are in contact was specified to be $-1\%$, that is $M=0.99$. In order to accomplish this, the lenses making up the individual components were schematically bent convex to the eye, sufficiently so that the interior principal planes of the two elements crossed, that is, the optical separation became negative, until, when the lenses were in contact the magnification was 0.99. This bending or cupping of lenses to accomplish a combined power and size change effect is, for example, described in the above-mentioned Patent No. 1,944,871. The power of each of the lenses is left unchanged by the bending process.

The unusual mounting of the lenses as though bent convex to the eye produces for increasing separation slightly increasing pincushion distortion. This distortion is unimportant for the use in the eye testing instrument above referred to, since the device is used for a finite peripheral angle. The device is calibrated for that angle so that the magnification of the image for that angle is known for any given separation.

It should further be observed that the lens systems according to the invention are not necessarily without power, that is true power as defined by parallel incident light; it is only necessary that the vergence power does not appreciably vary with the changing magnification when the separation is varied. Such constant power can be eliminated, if required, by means of lenses of opposite power combined with the instrument according to the invention. It will be evident that in this case there is no truly terrascopic point within the whole range of lens element separation, but a point which strictly gives a certain specified power or separation of virtual image and object, whereas the other separations produce varying magnifications with a negligible power variation within a certain tolerance.

Figs. 12, 12ª and 13 show the mechanical arrangement of the device as it may be incorporated in a clinical instrument similar to that of the above-mentioned copending application Serial No. 706,523, one such device being provided for each eye. In Figs. 2 and 12ª, these mechanical details are schematically shown in order to indicate their function in correlation with the optical system for varying the image magnification without substantially varying the vergence power. In Figs. 12 and 13, 11 is a lens support plate which has a flange 12 for a semi-transparent reflector and extends into a rod 13 forming a track for certain eye testing devices. The plate 11 extends into a lens block 14 supporting two fixed lens holders 15 and 16 and having two grooves 17 and 18 guiding adjustable lens supports 17' and 18'.

Fixed to one side of the lens block 14 are two pinion sleeves 21 and 22 with indicator discs 23 and 24, respectively. In these sleeves are journaled shafts 25 and 26 with pinions 27 and 28, respectively, located within grooves 17 and 18, respectively, the shafts being fastened at their other ends to manipulating elements 31 and 32 with knurled knobs 33 and 34 and scale discs 35 and 36. Knobs and scale discs are preferably fastened to the shafts with separate means, for example, the set screws shown in Fig. 12, for the purpose of preventing disadjustment of the scales in case the knob should be turned forcibly after the lens supports are stopped in ultimate position. Racks 41 and 42 are fastened to lens supports 17' and 18', respectively, and mesh with pinions 27 and 28. The distances between holders 15 and 16 and supports 17' and 18', respectively, can therefore be gradually and continuously changed by turning knobs 33 and 34, respectively. The scale discs 35 and 36 rotate in contact with indicator discs 23 and 24, respectively, the discs being suitably graduated to permit direct reading of percentual magnifications corresponding to certain separations between the lens elements in holders 15 and 16 and supports 17' and 18', respectively. It will be evident that one revolution of the pinions and of the scale discs corresponds approximately to the maximum lens separation of about 10 mm.

The lens holders are semi-circular and grooved to receive the mountings of lens elements 50, which, in the case of cylindrical lenses, may be provided with handles or other instrumentalities to rotate them into proper position relative to the visual meridian with respect to which they are intended to effect image size changes. In the present embodiment, holders 15 and 16 are shown with double grooves, one groove being provided for other trial lenses.

The new lens combination is also very well suited for bringing about or correcting asymmetrical image distortions in the following manner. It is evident from the foregoing theoretical discussion that, since a change of the lens element separation influences the magnification but not the power, an inclination of the lens planes (that is, different distances between coaxial points of the principal planes of the lens elements) causes a magnification which changes asymmetrically across the image plane, whose position, however, is not substantially affected due to the no power change characteristics of the lens system. Mutual inclination of the two lens elements of a lens pair can be brought about by various means, but the one shown in Figs. 1 to 16 is especially suited for this purpose, since it permits mutual lens element inclination without change of the mean distance between inclined lens and eye.

Figs. 14, 15, and 16 show a lens holder 51 which may be permanently fixed to lens block 14 or detachably fastened thereto by means of pins 52, 53 extending from pad 54 and fitting into holes 55, 56 of block 14 (Fig. 13). A pivot support 61 sliding with a dovetail arc 62 in holder 51, has a journal boss 63 with a journal bore 64. A lens support 71 is provided with a circular disc 72 and a pivot pin 73, disc 72 resting against boss 63 and being retained in position by pin 73 which may be secured in hole 64 with a nut 74 or by other suitable means. Disc 72 has a scale 76 permitting the operator to read the angular movement of journaled support 71, with the aid of index mark 77 on journal boss 63. Lenses can be inserted in support 71 which has a groove similar to that of holder 16 (Fig. 13). It will now be evident that this arrangement permits the rotation of lens element 50 about pivot 73, as indicated in Fig. 14 with dotted lines. The axis of pivot 73 again may be brought into different angular positions by rotating dovetail arc 62 in holder 51. This movement can be evaluated by means of a scale 78 and index 79 on parts 61 and 51, respectively. It is further evident that suitable means, as for example set screws, can be arranged for arresting members 61 and 71 in any given position relatively to holder 51.

When using the new lens combinations in the embodiment described, the patient's head is fixed in relation to the instrument, and lens elements for near vision are inserted in the holders. The clinician then adjusts the lenses by turning knobs 33 and 34 and the corresponding knobs for the other eye, and by turning the lens mounts of the meridional or cylindrical lenses in their holders, until the test means appear as required, for example, as described in one of the aforementioned patents. The image magnitude changes can be directly read on scale discs 35, 36 and the patient's defects determined accordingly. The lenses for near vision are then exchanged for those for distant vision, and the test repeated at distant vision. Asymmetric image size changes are obtainable by suitably operating arrangements similar to that shown in Figs. 14 to 16, in a manner which will now be evident without further explanation.

While the herein described apparatus and its operation conform to a most frequently applied clinical test, it will be evident that the new advice can be advantageously employed with different mounting and adjusting arrangements, and for different purposes involving continuous changes of image size.

It should be understood that the present disclosure is for the purpose of illustration only, and that this invention includes all modifications and equivalents which fall within the scope of the appended claims.

I claim:

1. An optical system of the type described comprising towards the object a positive lens having a focal length of approximately one-half its interval from said object, and a negative back lens having a focal length of approximately the distance between said object and said back lens multiplied by the difference of said interval and the separation of said two lenses, and divided by twice said interval.

2. An optical system according to claim 1 further characterized by a separation giving a predetermined optical power of said system for said distance between front lens and eye.

3. An optical system according to claim 1 further characterized by a separation imparting to said system, for said distance between front lens and eye, the optical vergence power zero.

4. An optical system according to claim 1 further characterized in that for separations varying within a certain range, the optical vergence power of said system varies within predetermined limits of tolerance.

5. An optical system of the type described comprising towards the object a positive front lens having a focal length of approximately one-half its distance from said object, and a negative back lens having a focal length of approximately one-half its distance from the object multiplied by the quantity one minus the separation of said two lenses divided by said distance of the front lens from the object.

6. A device of the type described comprising an optical system including two lens elements substantially equivalent to a thin positive lens having a focal length of approximately one-half its interval from the object to be observed combined with a thin negative lens having a focal length of approximately the distance between said object and said negative lens multiplied with the difference of said interval and the separation of said two lenses and divided by twice said interval, the optical vergence power of said optical system varying within predetermined limits of tolerance for separations of said lens elements varying within a certain range, and means for changing said separation.

7. A device of the character described for testing or exercising ocular defects involving the magnification of an ocular image of a test object observed at a given distance from the eyes, comprising a lens support, means for holding separate test lens elements arranged on said support for adjustment relatively to each other in alignment for observation of said test object through such lens elements, a lens system having two lens elements each mounted on respective ones of said holding means and each formed of lens medium of a given index of refraction and having surface powers computed according to said indices and according to the spaced relation of said elements, with the surfaces of each of said elements being dependent upon the other, said object distance and the distance of said system from the eye, to produce at certain values of separation, within the range of said adjustment of said holding means on said support, varying magnifications of said ocular image while maintaining the vergence power of said system within physiologically substantially ineffective limits, and means operatively associated with said holding means for indicating the amount of said ocular image magnification corresponding to said separation values.

8. A device of the character described for testing or exercising ocular defects involving the magnification of an ocular image, comprising test object means, a lens support, means for holding separate test lens elements arranged on said support before one eye for adjustment relative to each other in alignment for observation of said test object means through such lens elements, means substantially determining the distance of said support from said test object, a lens system having two lens elements each mounted on respective ones of said holding means and each formed of lens medium of a given index of refraction and having surface powers computed according to said indices and according to a given separation of said elements, with the surfaces of each of said elements being dependent upon the other, said object distance, said given separation, and the distance of said system from the eye, to produce at certain values of separation within the range of adjustment of said holding means on said support and including said given separation, varying magnifications of said ocular image while maintaining the vergence power of said system within physiologically substantially ineffective limits, and means operatively associated with said holding means for indicating the amount of said ocular image magnification corresponding to said separation values.

9. A device of the character described for testing defects of binocular vision involving the measurement of the size of one ocular image of given test object means at a given distance from the eyes, in relation to the other ocular image of said test object means, comprising a lens support, means for holding separate test lens elements arranged on said support before one eye for adjustment relative to each other in alignment for observation of said test object means through such lens elements, and a lens system having two lens elements each mounted on respective ones of said holding means and each formed of lens medium of a given index of refraction and having surface powers computed according to said indices and according to the spaced relation of said elements, with the surfaces of each of said elements being dependent upon the other, said object distance and the distance of said system from the eye, to produce at certain values of separation, within the range of said adjustment of said holding means on said support, varying sizes of said ocular image while maintaining the vergence power of said system within physiologically substantially ineffective limits, and means operatively associated with said holding means for indicating said ocular image size relation corresponding to said separation values.

10. A device of the character described for testing defects of binocular vision involving the measurement of the size of one ocular image of given test object means at a given distance from the eyes, in relation to the other ocular image of said test object means, comprising a lens support, means for holding separate test lens elements arranged on said support before one eye for adjustment relative to each other in alignment for observation of said test object means through such lens elements, and a lens system having a negative and a positive lens element each mounted on respective ones of said holding means and each formed of lens medium of a given index of refraction and having surface powers computed according to said indices and according to the spaced relation of said elements, with the surfaces of each of said elements being dependent upon the other, said object distance and the distance of said system from the eye, to produce at certain values of separation, within the range of said adjustment of said holding means on said support, varying sizes of said ocular image while maintaining the vergence power of said system within physiologically substantially ineffective limits, and means operatively associated with said holding means for indicating the amount of said ocular image size relation corresponding to said separation values.

KENNETH N. OGLE.